United States Patent
Chang et al.

(10) Patent No.: US 10,303,158 B2
(45) Date of Patent: May 28, 2019

(54) THREE DIMENSION PRINTING COLORING METHOD AND THREE DIMENSION PRINTING SYSTEM

(71) Applicants: XYZprinting, Inc., New Taipei (TW); Kinpo Electronics, Inc., New Taipei (TW)

(72) Inventors: Yu-Chuan Chang, New Taipei (TW); Hsin-Ta Hsieh, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 84 days.

(21) Appl. No.: 15/465,618

(22) Filed: Mar. 22, 2017

(65) Prior Publication Data
US 2018/0194077 A1    Jul. 12, 2018

(30) Foreign Application Priority Data
Jan. 6, 2017   (TW) .............................. 106100367 A (51) Int. Cl.
*B33Y 10/00*        (2015.01)
*B33Y 30/00*        (2015.01)
(Continued)

(52) U.S. Cl.
CPC ........ *G05B 19/4099* (2013.01); *B29C 64/106* (2017.08); *B29C 64/386* (2017.08);
(Continued)

(58) Field of Classification Search
None
See application file for complete search history.

(56) References Cited

U.S. PATENT DOCUMENTS

| 2015/0343704 A1 | 12/2015 | Stahl et al. |
| 2018/0186089 A1* | 7/2018 | Chang ................ B29C 67/0055 |
| 2018/0189618 A1* | 7/2018 | Huang ................ G06K 15/1878 |

FOREIGN PATENT DOCUMENTS

| CN | 105625720 | 6/2016 |
| WO | 2015163776 | 10/2015 |

(Continued)

OTHER PUBLICATIONS

"Search Report of Europe Counterpart Application", dated Aug. 28, 2017, p. 1-p. 10, in which the listed references were cited.
(Continued)

*Primary Examiner* — Ryan A Jarrett
(74) *Attorney, Agent, or Firm* — JCIPRNET (57) ABSTRACT

A three dimension (3D) printing coloring method and a 3D printing system are provided. The method includes: generating printing object information according to model information of a 3D object, where the printing object information includes first contour coloring information and second contour coloring information; determining whether a similarity degree of the first contour coloring information and the second contour coloring information conforms to a default condition; if the similarity degree conforms to the default condition, controlling, according to the first contour coloring information and the second contour coloring information, a 3D printing device to perform a simultaneous coloring operation on a first printing layer and a second printing layer of a 3D object. Therefore, a working efficiency of the 3D printing device can be improved.

16 Claims, 8 Drawing Sheets

(51) Int. Cl.
*B33Y 40/00* (2015.01)
*B33Y 50/02* (2015.01)
*B29C 64/106* (2017.01)
*B29C 64/386* (2017.01)
*G05B 19/4099* (2006.01)

(52) U.S. Cl.
CPC .............. *B33Y 10/00* (2014.12); *B33Y 30/00* (2014.12); *B33Y 40/00* (2014.12); *B33Y 50/02* (2014.12); *B29K 2995/002* (2013.01); *G05B 2219/35134* (2013.01); *G05B 2219/49007* (2013.01)

(56) References Cited

FOREIGN PATENT DOCUMENTS

| | | |
|---|---|---|
| WO | 2015178443 | 11/2015 |
| WO | 2016003277 | 1/2016 |
| WO | 2016081496 | 5/2016 |
| WO | 2016191473 | 12/2016 |

OTHER PUBLICATIONS

Office Action of Taiwan Counterpart Application, dated Feb. 15, 2019, pp. 1-6.

\* cited by examiner

THREE DIMENSION PRINTING COLORING METHOD AND THREE DIMENSION PRINTING SYSTEM

CROSS-REFERENCE TO RELATED APPLICATION

This application claims the priority benefit of Taiwan application serial no. 106100367, filed on Jan. 6, 2017. The entirety of the above-mentioned patent application is hereby incorporated by reference herein and made a part of this specification.

BACKGROUND OF THE INVENTION

1. Field of the Invention

The present invention relates to an operation of a three dimension (3D) printing device, and in particular, to a 3D printing coloring method and a 3D printing system.

2. Description of Related Art

Corresponding to different types of the 3D printing device, a molding material may be colored before ejecting or may be colored after ejecting. When the molding material is first ejected and then be colored by the 3D printing device, generally, each time the 3D printing device ejects one layer of molding material, the 3D printing device subsequently colors this layer of the molding material. However, the method of coloring layer by layer makes the executed 3D printing work lack flexibility and efficiency. In addition, a conventional 3D printing device also lacks a determining mechanism for dynamically determining whether simultaneously coloring multiple printing layers.

SUMMARY OF THE INVENTION

In view of the above, the present invention provides a 3D printing coloring method and a 3D printing system, thereby improving a working efficiency of a 3D printing device.

An embodiment of the present invention provides a 3D printing coloring method, applied to a 3D printing system including a storage device and a 3D printing device, where the storage device is configured to store model information of a 3D object, and the 3D printing coloring method includes: generating printing object information according to the model information of the 3D object, where the printing object information includes first contour coloring information corresponding to a first printing layer of the 3D object and second contour coloring information corresponding to a second printing layer of the 3D object, where the first printing layer is adjacent to the second printing layer; determining whether a similarity degree of the first contour coloring information and the second contour coloring information conforms to a default condition; and if the similarity degree conforms to the default condition, controlling, according to the first contour coloring information and the second contour coloring information, the 3D printing device to perform a simultaneous coloring operation on the first printing layer and the second printing layer of the 3D object.

In an embodiment of the present invention, the step of determining whether the similarity degree of the first contour coloring information and the second contour coloring information conforms to the default condition includes: determining, according to the first contour coloring information and the second contour coloring information, whether a first contour of the first printing layer is covered by a second contour of the second printing layer in a coloring direction.

In an embodiment of the present invention, the step of determining whether the similarity degree of the first contour coloring information and the second contour coloring information conforms to the default condition includes: determining, according to the first contour coloring information and the second contour coloring information, whether a surface inclined state of a common surface of a first contour of the first printing layer and a second contour of the second printing layer conforms to a default state.

In an embodiment of the present invention, the step of determining whether the similarity degree of the first contour coloring information and the second contour coloring information conforms to the default condition includes: determining, according to the first contour coloring information and the second contour coloring information, whether a first contour of the first printing layer is covered by a second contour of the second printing layer in a coloring direction; and if the first contour is covered by the second contour in the coloring direction, determining that the similarity degree of the first contour coloring information and the second contour coloring information does not conform to the default condition.

In an embodiment of the present invention, the step of determining whether the similarity degree of the first contour coloring information and the second contour coloring information conforms to the default condition further includes: if the first contour is not covered by the second contour in the coloring direction, determining, according to the first contour coloring information and the second contour coloring information, whether a surface inclined state of a common surface of the first contour and the second contour conforms to a default state; if the surface inclined state of the common surface of the first contour and the second contour does not conform to a default state, determining that the similarity degree of the first contour coloring information and the second contour coloring information does not conform to the default condition; and if the surface inclined state of the common surface of the first contour and the second contour conforms to the default state, determining that the similarity degree of the first contour coloring information and the second contour coloring information conforms to the default condition.

In an embodiment of the present invention, the step of controlling, according to the first contour coloring information and the second contour coloring information, the 3D printing device to perform the simultaneous coloring operation on the first printing layer and the second printing layer of the 3D object includes: combining the first contour coloring information and the second contour coloring information into combined coloring information; and controlling, according to the combined coloring information, the 3D printing device to perform the simultaneous coloring operation on the first printing layer and the second printing layer of the 3D object.

In an embodiment of the present invention, the step of combining the first contour coloring information and the second contour coloring information into the combined coloring information includes: combining a first valid region of the first contour coloring information and a second valid region of the second contour coloring information into a third valid region of the combined coloring information, where the third valid region corresponds to a moving region of a ink jet head of the 3D printing device in the simultaneous coloring operation.

In an embodiment of the present invention, the step of combining the first contour coloring information and the second contour coloring information into the combined coloring information further includes: performing at least one of an edge smoothing operation and a gap filling operation on the third valid region of the combined coloring information.

Another embodiment of the present invention provides a 3D printing system, including a 3D printing device, a storage device, and a processor, where the storage device is configured to store model information of a 3D object; and a processor is coupled to the 3D printing device and the storage device, and is configured to: generate printing object information according to the model information of the 3D object, where the printing object information includes first contour coloring information corresponding to a first printing layer of the 3D object and second contour coloring information corresponding to a second printing layer of the 3D object, where the first printing layer is adjacent to the second printing layer; determine whether a similarity degree of the first contour coloring information and the second contour coloring information conforms to a default condition; and if the similarity degree conforms to the default condition, control, according to the first contour coloring information and the second contour coloring information, the 3D printing device to perform a simultaneous coloring operation on the first printing layer and the second printing layer of the 3D object.

In an embodiment of the present invention, the operation of determining whether the similarity degree of the first contour coloring information and the second contour coloring information conforms to the default condition includes: determining, according to the first contour coloring information and the second contour coloring information, whether a first contour of the first printing layer is covered by a second contour of the second printing layer in a coloring direction.

In an embodiment of the present invention, the operation of determining whether the similarity degree of the first contour coloring information and the second contour coloring information conforms to the default condition includes: determining, according to the first contour coloring information and the second contour coloring information, whether a surface inclined state of a common surface of a first contour of the first printing layer and a second contour of the second printing layer conforms to a default state.

In an embodiment of the present invention, the operation of determining whether the similarity degree of the first contour coloring information and the second contour coloring information conforms to the default condition includes: determining, according to the first contour coloring information and the second contour coloring information, whether a first contour of the first printing layer is covered by a second contour of the second printing layer in a coloring direction; and if the first contour is covered by the second contour in the coloring direction, determining that the similarity degree of the first contour coloring information and the second contour coloring information does not conform to the default condition.

In an embodiment of the present invention, the operation of determining whether the similarity degree of the first contour coloring information and the second contour coloring information conforms to the default condition further includes: if the first contour is not covered by the second contour in the coloring direction, determining, according to the first contour coloring information and the second contour coloring information, whether a surface inclined state of a common surface of the first contour and the second contour conforms to a default state; if the surface inclined state of the common surface of the first contour and the second contour does not conform to the default state, determining that the similarity degree of the first contour coloring information and the second contour coloring information does not conform to the default condition; and if the surface inclined state of the common surface of the first contour and the second contour conforms to the default state, determining that the similarity degree of the first contour coloring information and the second contour coloring information conforms to the default condition.

In an embodiment of the present invention, the operation of controlling, according to the first contour coloring information and the second contour coloring information, the 3D printing device to perform the simultaneous coloring operation on the first printing layer and the second printing layer of the 3D object includes: combining the first contour coloring information and the second contour coloring information into combined coloring information; and controlling, according to the combined coloring information, the 3D printing device to perform the simultaneous coloring operation on the first printing layer and the second printing layer of the 3D object.

In an embodiment of the present invention, the operation of combining the first contour coloring information and the second contour coloring information into the combined coloring information includes: combining a first valid region of the first contour coloring information and a second valid region of the second contour coloring information into a third valid region of the combined coloring information, where the third valid region corresponds to a moving region of a ink jet head of the 3D printing device in the simultaneous coloring operation.

In an embodiment of the present invention, the operation of combining the first contour coloring information and the second contour coloring information into the combined coloring information further includes: performing at least one of an edge smoothing operation and a gap filling operation on the third valid region of the combined coloring information.

Based on the above, the 3D printing coloring method and the 3D printing system may determine, according to whether an object contour formed by a molding material conforms to a default condition, to control a 3D printing device to perform a single layer coloring operation on the molding material by using a single layer coloring method or change to perform a multilayer simultaneous coloring operation on the molding material by using a multilayer simultaneous coloring method, so as to improve a working efficiency of the 3D printing device.

To make the foregoing features and advantages of the present invention more obvious and understandable, the following text, combined with accompany drawings, uses embodiments to make detailed descriptions.

DESCRIPTION OF THE EMBODIMENTS

Figure 1:
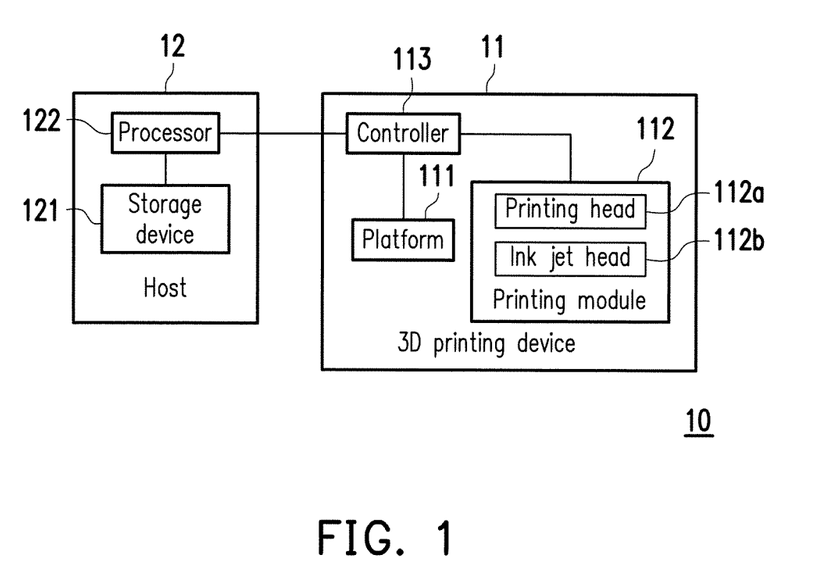
FIG. 1 is a schematic diagram of a 3D printing system according to an embodiment of the present invention.

FIG. 1 is a schematic diagram of a 3D printing system according to an embodiment of the present invention. Referring to FIG. 1, the 3D printing system 10 includes a 3D printing device 11 and a host 12. The 3D printing device 11 is configured to perform a 3D printing operation. The host 12 is coupled to the 3D printing device 11 and is configured to control the 3D printing device 11. For example, the host 12 may send a control instruction to instruct the 3D printing device 11 to perform the 3D printing operation. The host 12 may be various electronic devices with functions of data transmission, storing, and processing, such as a smart phone, a tablet computer, a desktop computer, a laptop, or an industrial computer. In addition, the host 12 and the 3D printing device 11 may also be integrated into a single device.

The host 12 includes a storage device 121 and a processor 122. The storage device 121 is configured to store data and may be a buffer memory, an internal storage medium, an external storage medium, a storage device of another type, or a combination of these devices. For example, the buffer memory may include a random access memory, a read-only memory, or another similar device. For example, the internal storage medium may include a hard disk drive (HDD), a solid state disk (SSD), a flash memory storage device, or another similar device. For example, the external storage medium may include an external HDD, a USB drive, a cloud storage device, or another similar device.

The processor 122 is coupled to the storage device 121 and is configured to access the storage device 121 and generate a control instruction for controlling the 3D printing device 11. In addition, the processor 122 may also control running of other components in the host 12. For example, the processor 122 may be a central processing unit (CPU), or a programmable microprocessor with ordinary use or special use, a digital signal processor (DSP), a programmable controller, application specific integrated circuit (ASIC), a programmable logic device (PLD), another similar processing device, or a combination of these devices.

Figure 2:
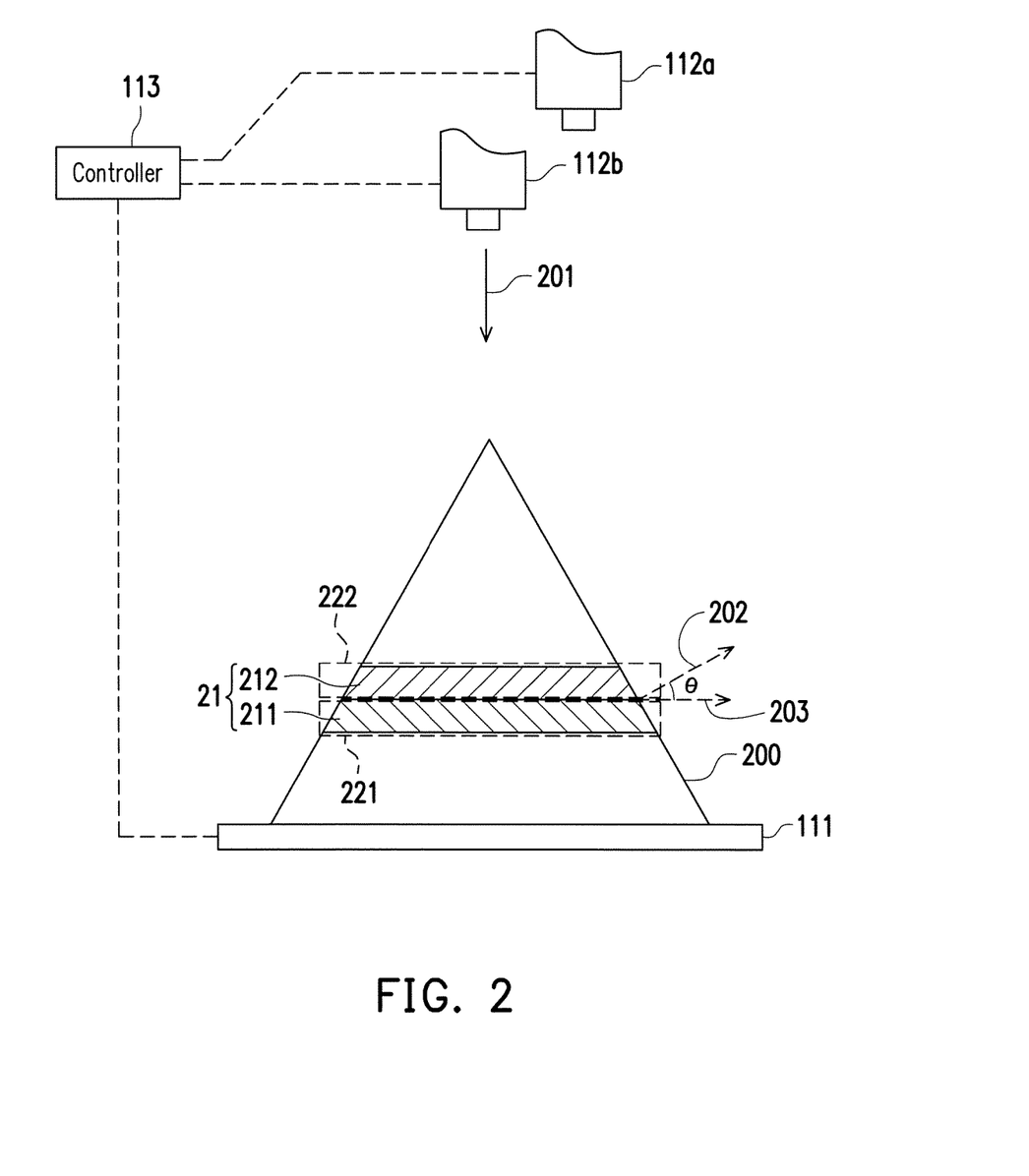
FIG. 2 is a schematic diagram of a 3D printing operation according to an embodiment of the present invention.

FIG. 2 is a schematic diagram of a 3D printing operation according to an embodiment of the present invention. Referring to FIG. 1 and FIG. 2, the 3D printing device 11 includes a platform 111, a printing module 112, and a controller 113. Both the platform 111 and the printing module 112 are coupled to the controller 113. The printing module 112 includes a printing head 112a and an ink jet head 112b. Both the printing head 112a and the ink jet head 112b are disposed above the platform 111. During a 3D printing operation, the printing head 112a is configured to feed out a molding material, and the ink jet head 112b is configured to feed out a dye (or ink). It should be noted that a person of ordinary skill in the art should know that the printing module 112 may also include other components (such as a feed line, a printing head linkage mechanism, and an ink jet head linkage mechanism) configured to complete the 3D printing operation together with the printing head 112a and the ink jet head 112b, and the descriptions thereof are omitted herein.

When performing the 3D printing operation, the printing head 112a prints layer by layer from a bottom layer of a 3D object 200, so as to gradually form the 3D object 200 on a bearing surface of the platform 111. More specifically, the printing head 112a moves above the platform 111 in changeable directions and feeds out the molding material of a fused state. Then, the molding material is solidified on the platform 111 layer by layer and forms the 3D object 200. In addition, during the 3D printing operation, the ink jet head 112b feeds out the dye (or ink) to color one layer or multiple layers of the molding materials stacked on the platform 111.

Back to FIG. 1, the controller 113 is configured to control, according to the control instruction of the processor 122, the printing head 112 to move and feed out the molding material, and control the ink jet head 112b to move and feed out the dye. For example, the controller 130 may be a microprocessor, a digital signal processor, a programmable controller, an embedded controller, application specific integrated circuits, a programmable logic device, another similar processing device, or a combination of these devices.

In this embodiment, the storage device 121 stores model information of the 3D object 200. For example, the model information is used to describe a 3D model of the 3D object 200. The processor 122 may generate printing object information of the 3D object 200 according to the model information of the 3D object 200. For example, the processor 122 may perform a layer-cutting operation on the 3D model of the 3D object 200 so as to obtain the printing object information of the 3D object 200. For example, the printing object information of the 3D object 200 includes multiple image files (which are also referred to layer-cutting image files). Each image file may be used to describe information such as a coloring region of a particular printing layer of a 3D object that is to be colored by the 3D printing device 11 and a dye color for coloring this coloring region. Therefore, the processor 122 may send a control instruction according to the printing object information so as to control the 3D printing device 11 to color one or more specific printing layers of the 3D object 200.

In this embodiment, the image file conforms to a printing cmyk color model. For example, a particular image file stored in the storage device 121 may be a cyan (Cyan, C) image file, a magenta (Magenta, M) image file, a yellow (Yellow, Y) image file, or a black (Key or blacK, K) image file. In addition, in another embodiment, the image file stored in the storage device may also conform to another color model such as a three-primary (RGB) color model. According to different image files, the controller 113 may control the ink jet head 112b to move in a specific region and feed out a dye of a specific color.

Taking FIG. 2 as an example, the printing object information includes contour coloring information (which is also referred to as first contour coloring information) corresponding to a printing layer (which is also referred to as a first printing layer) 221 of the 3D object 200 and contour coloring information (which is also referred to as second contour coloring information) corresponding to a printing layer (which is also referred to as a second printing layer) 222 of the 3D object 200, where the printing layer 221 is adjacent to the printing layer 222. For example, the first contour coloring information includes an image file corresponding to the printing layer 221 of the 3D object 200, and the second contour coloring information includes an image file corresponding to the printing layer 222 of the 3D object 200. According to the first contour coloring information, the controller 113 may control the ink jet head 112b to color an object contour (which is also referred to as a first contour) 211 in the printing layer 221 of the 3D object 200. According to the second contour coloring information, the controller 113 may control the ink jet head 112b to color an object contour (which is also referred to as a second contour) 212 in the printing layer 222 of the 3D object 200. In addition, during a 3D printing operation of the 3D object 200, the printing head 112a first feeds out a molding material to form the object contour 211 in the printing layer 221, and then feeds out a molding material to form the object contour 212 in the printing layer 222.

It should be noted that before coloring the object contour 211, the processor 122 determines whether a similarity degree of the first contour coloring information and the second contour coloring information conforms to a default condition. If the similarity degree of the first contour coloring information and the second contour coloring information conforms to the default condition, after forming the object contour 211 in the printing layer 221 and the object contour 212 in the printing layer 222, the processor 122 controls, according to the first contour coloring information and the second contour coloring information, the 3D printing device 11 to perform a simultaneous coloring operation (which is also referred to as a multilayer simultaneous coloring operation) on the printing layer 221 and the printing layer 222 of the 3D object 200. For example, the controller 113 controls the ink jet head 112b to move above the object contour (which is also referred to as a combined contour) 21 and feed out a dye of a specific color, so as to simultaneously color the object contours 211 and 212. In addition, if the similarity degree of the first contour coloring information and the second contour coloring information does not conform to the default condition, after the object contour 211 in the printing layer 221 is formed, the processor 122 controls, according to the first contour coloring information, the 3D printing device 11 to perform a single layer coloring operation on the printing layer 221 of the 3D object 200. For example, the controller 113 controls the ink jet head 112b to move above the object contour 211 and feed out a dye of a specific color, so as to separately color the object contour 211. After completing the single layer coloring operation on the printing layer 221, the object contour 212 in the printing layer 222 can be formed above the object contour 211.

During the simultaneous coloring operation, object contour 21 in at least two adjacent printing layers (such as the printing layer 221 and the printing layer 222) are simultaneously colored. During the single layer coloring operation, the object contour 211 or 212 in (only) a single printing layer is colored. In addition, time cost for performing the multilayer simultaneous coloring operation once is less than time cost for continuously performing the single layer coloring operation twice. Therefore, for a 3D printing operation of a particular 3D object, more times the multilayer simultaneous coloring operation is performed indicates faster completion of the 3D printing operation of the 3D object.

In an embodiment, the processor 122 determines, according to the first contour coloring information and the second contour coloring information, whether the object contour 211 is covered (or shielded) by the object contour 212 in a coloring direction 201. If the object contour 211 is not covered by the object contour 212 in the coloring direction 201, during the simultaneous coloring operation on the object contour 21, the ink jet head 112b may completely color the object contours 211 and 212. Therefore, in an embodiment, if the object contour 211 is not covered by the object contour 212 in the coloring direction 201, the processor 122 may determine that the similarity degree of the first contour coloring information and the second contour coloring information conforms to the default condition and perform the simultaneous coloring operation. Otherwise, if at least part of the object contour 211 is covered by the object contour 212 in the coloring direction 201, the processor 122 may determine that the similarity degree of the first contour coloring information and the second contour coloring information does not conform to the default condition and perform the single layer coloring operation.

It should be noted that the coloring direction 201 refers to a direction (which is also referred to as an ink jet direction) that the ink jet head 112b of the 3D printing device 11 feeds out the dye. For example, the coloring direction is perpendicular to the surface on the platform 111 for bearing the 3D object 200 or is parallel to an injection direction (or a normal vector direction of the bearing surface of the platform 111) of the bearing surface of the platform 111.

In an embodiment, the first contour coloring information and the second contour coloring information respectively includes surface inclined information of the object contour 211 and the object contour 212. Therefore, the processor 122 determines, according to the first contour coloring information and the second contour coloring information, whether a surface inclined state of a common surface (that is, a surface of the object contour 21) of the object contour 211 and the object contour 212 conforms to a default state. If the surface inclined state of the common surface of the object contour 211 and the object contour 212 conforms to the default state, the processor 122 may determine that the similarity degree of the first contour coloring information and the second contour coloring information conforms to the default condition and perform the simultaneous coloring operation. Otherwise, if the surface inclined state of the common surface of the object contour 211 and the object contour 212 does not conform to the default state, the processor 122 may determine that the similarity degree of the first contour coloring information and the second contour coloring information does not conform to the default condition and perform the single layer coloring operation.

It should be noted that the surface inclined state is related to an included angle degree between a vertical direction of the surface of the object contour 21 and a horizontal direction. For example, the surface inclined state of the object contour 21 includes an included angle degree θ. The included angle degree θ is an angle of an included angle between a vertical direction 202 of the surface of the object contour 21 and a horizontal direction 203. In an embodiment, the vertical direction 202 is also referred to as a normal vector direction of the surface of the object contour 21.

In an embodiment, the horizontal direction 203 is a direction parallel to the horizontal plane. In another embodiment, the horizontal direction 203 may refer to a direction parallel to a bearing surface on the platform 111 for bearing the 3D object 200. In an embodiment, if the included angle degree θ is greater than a default angle, the processor 122 determines that the surface inclined state of the common surface of the object contour 211 and the object contour 212 conforms to the default state. Otherwise, if the included angle degree θ is not greater than the default angle, the processor 122 determines that the surface inclined state of the common surface of the object contour 211 and the object contour 212 does not conform to the default state. For example, the default angle may be 30 degree, or more or less.

In an embodiment, the processor 122 may determine, simultaneously according to whether the object contour 211 is covered by the object contour 212 in the coloring direction 201 and whether the surface inclined state of the common surface of the object contour 211 and the object contour 212 conforms to the default state, whether the similarity degree of the first contour coloring information and the second contour coloring information conforms to the default condition. For example, in an embodiment, (only) if the object contour 211 is not covered (or shielded) by the object contour 212 in the coloring direction 201 and the included angle degree θ is greater than the default angle, the processor 122 determines that the similarity degree of the first contour coloring information and the second contour coloring information conforms to the default condition. Otherwise, if at least a part of the object contour 211 is covered (or shielded) by the object contour 212 in the coloring direction 201 and/or the included angle degree θ is not greater than the default angle, the processor 122 determines that the similarity degree of the first contour coloring information and the second contour coloring information does not conform to the default condition.

In an embodiment, after controlling, according to the first contour coloring information, the 3D printing device 11 to perform the single layer coloring operation on the printing layer 221 of the 3D object 200, the processor 121 may also control, according to the second contour coloring information, the 3D printing device 11 to perform the single layer coloring operation on the printing layer 222 of the 3D object 200, or control, according to the second contour coloring information and another contour coloring information (which is also referred to as third contour coloring information), the 3D printing device 11 to perform the simultaneous coloring operation on the printing layer 222 and another printing layer (which is also referred to as a third printing layer) of the 3D object 200.

Figure 3:
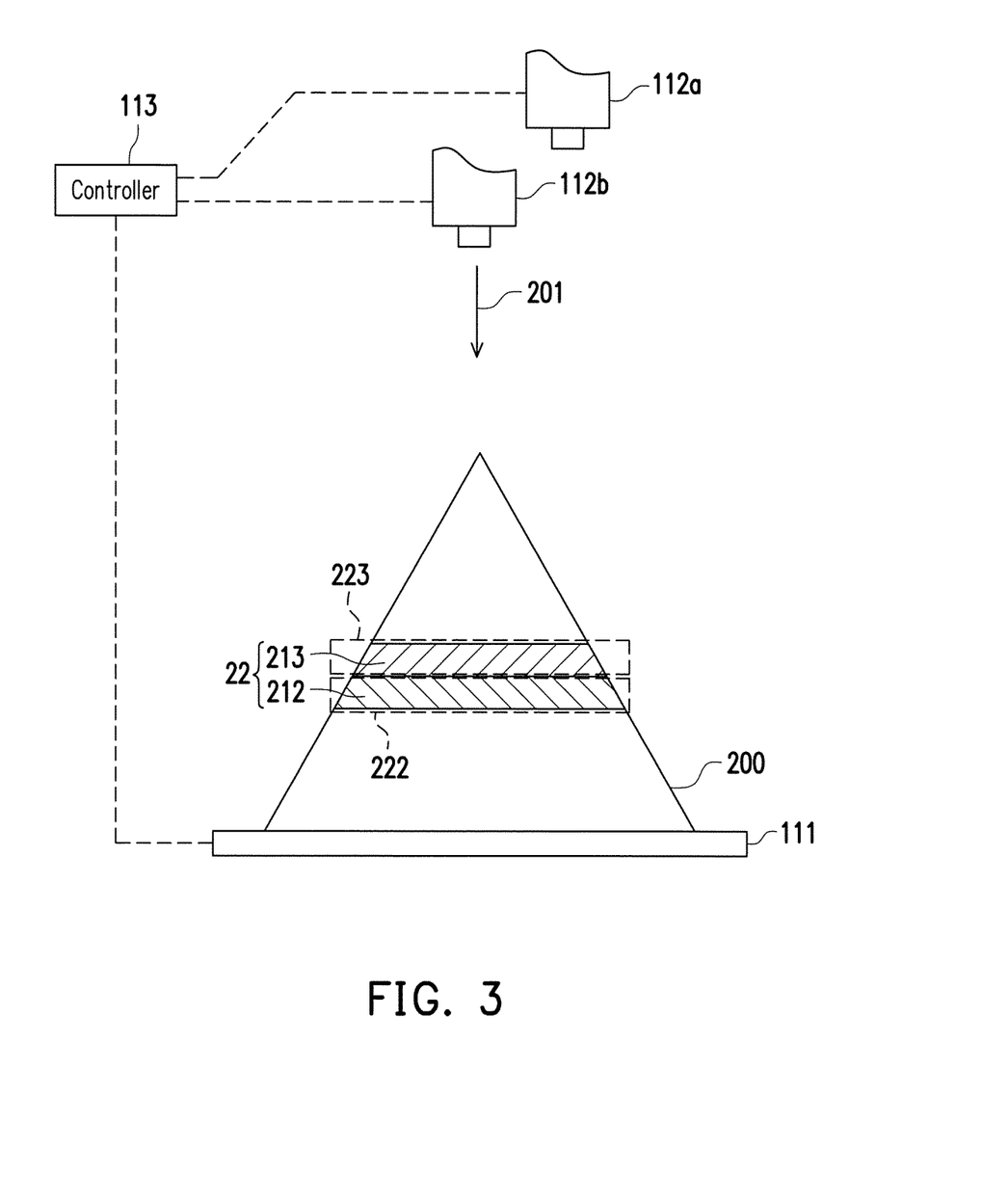
FIG. 3 is a schematic diagram of a 3D printing operation according to another embodiment of the present invention.

FIG. 3 is a schematic diagram of a 3D printing operation according to another embodiment of the present invention. Referring to FIG. 1 to FIG. 3, in an embodiment, after completing the single layer coloring operation on the object contour 211, the processor 121 may determine whether a similarity degree of the second contour coloring information and the third contour coloring information conforms to the default condition. The third contour coloring information corresponds to a printing layer 223 of the 3D object 200, and the controller 113 may control, according to the third contour coloring information, the ink jet head 112b to color an object contour (which is also referred to as a third contour) 213 in the printing layer 223 of the 3D object 200. In addition, the object contour 213 in the printing layer 223 is formed after the object contour 212 is formed. If the similarity degree of the second contour coloring information and the third contour coloring information does not conform to the default condition, the controller 113 may control the ink jet head 112b to perform the single layer coloring operation on the object contour 212 in the printing layer 222.

Figure 4A:
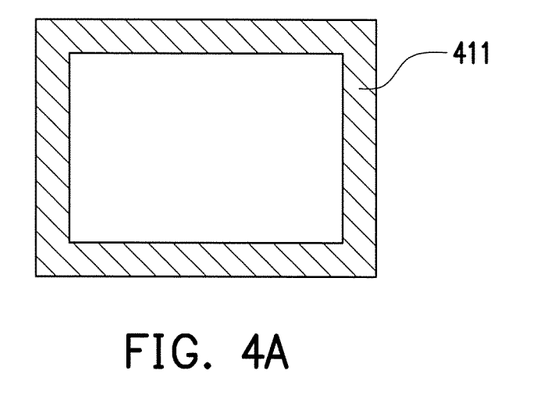
FIG. 4A is a schematic diagram of performing a single layer coloring operation on a first printing layer according to an embodiment of the present invention.

FIG. 4A is a schematic diagram of performing a single layer coloring operation on a first printing layer according to an embodiment of the present invention. It should be noted that the following FIG. 4A to FIG. 4C are top views of the platform 111. Referring to FIG. 2 and FIG. 4A, during the single layer coloring operation performed on the printing layer 221, the ink jet head 112b moves in a coloring region 411 (marked by a slash) and feeds out a dye. The coloring region 411 is equivalent to the object contour 211.

Figure 4B:
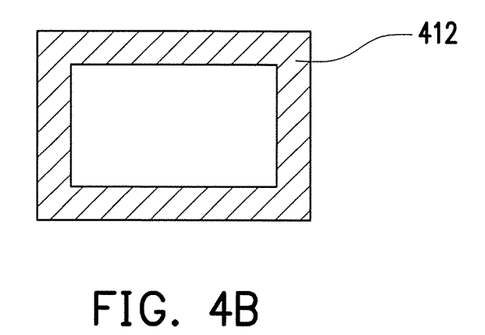
FIG. 4B is a schematic diagram of performing a single layer coloring operation on a second printing layer according to an embodiment of the present invention.

FIG. 4B is a schematic diagram of performing a single layer coloring operation on a second printing layer according to an embodiment of the present invention. Referring to FIG. 2 and FIG. 4B, during the single layer coloring operation performed on the printing layer 222, the ink jet head 112b moves in a coloring region 412 (marked by a slash) and feeds out a dye. The coloring region 412 is equivalent to the object contour 212.

Figure 4C:
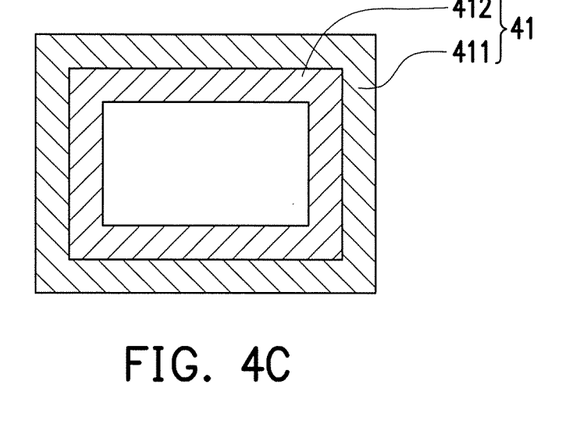
FIG. 4C is a schematic diagram of performing a multi-layer simultaneous coloring operation on a first printing layer and a second printing layer according to an embodiment of the present invention.

FIG. 4C is a schematic diagram of performing a multi-layer simultaneous coloring operation on a first printing layer and a second printing layer according to an embodiment of the present invention. Referring to FIG. 2 and FIG. 4C, during the simultaneous layer coloring operation performed on the printing layers 221 and 222, the ink jet head 112b moves in a coloring region 41 (marked by a slash) and feeds out a dye. The coloring region 41 includes the coloring regions 411 and 412. In addition, the coloring region 41 is equivalent to the object contour 21.

In an embodiment, if the processor 122 determines that the similarity degree of the first contour coloring information and the second contour coloring information conforms to the default condition, the processor 122 combines the first contour coloring information and the second contour coloring information into another contour coloring information (which is also referred to as combined coloring information). For example, the processor 122 combines a valid region (which is also referred to as a first valid region) of the first contour coloring information and a valid region of the second contour coloring information into a valid region (which is also referred to as a third valid region) of the combined coloring information. The third valid region corresponds to a moving region of the ink jet head 122b of the 3D printing device 11 during the simultaneous coloring operation on the object contour 21. Then, the processor 122 controls, according to the combined coloring information, the 3D printing device 11 to perform the simultaneous coloring operation on the printing layer 221 and the printing layer 222 of the 3D object 200.

Figure 5A:
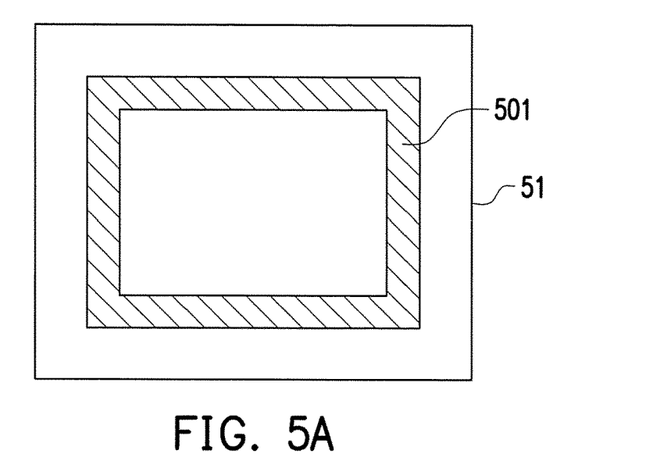
FIG. 5A is a schematic diagram of first contour coloring information according to an embodiment of the present invention.

FIG. 5A is a schematic diagram of first contour coloring information according to an embodiment of the present invention. Referring to FIG. 2, FIG. 4A, and FIG. 5A, it is assumed that the first contour coloring information includes an image file 51, and the image file 51 corresponds to the printing layer 221 of the 3D object 200. The image file 51 includes a valid region (i.e., the first valid region) 501. The valid region 501 corresponds to a moving region of the ink jet head 112b during a single layer coloring operation of the object contour 211. For example, the valid region 501 may be used to indicate coordinate information of the object contour 211 (or the coloring region 411 in FIG. 4A). According to the image file 51, the controller 113 may control the ink jet head 112b to perform the single layer coloring operation on the object contour 211.

Figure 5B:
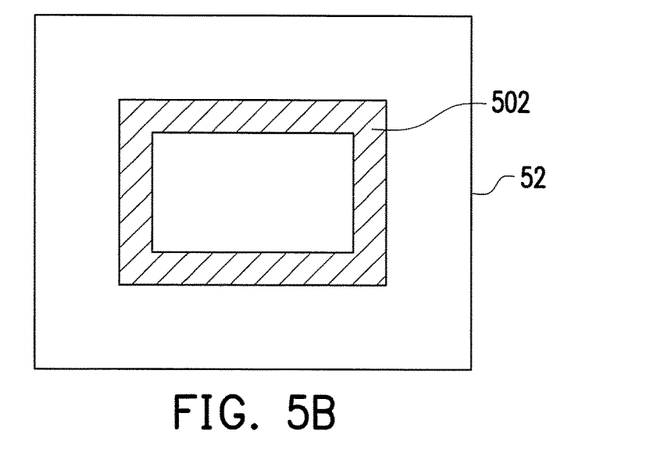
FIG. 5B is a schematic diagram of second contour coloring information according to an embodiment of the present invention.

FIG. 5B is a schematic diagram of second contour coloring information according to an embodiment of the present invention. Referring to FIG. 2, FIG. 4B, and FIG. 5B, it is assumed that the second contour coloring information includes an image file 52, and the image file 52 corresponds to the printing layer 222 of the 3D object 200. The image file 52 includes a valid region (i.e., the second valid region) 502. The valid region 502 corresponds to a moving region of the ink jet head 112*b* during a single layer coloring operation of the object contour 212. For example, the valid region 502 may be used to indicate coordinate information of the object contour 212 (or the coloring region 412 in FIG. 4B). According to the image file 52, the controller 113 may control the ink jet head 112*b* to perform the single layer coloring operation on the object contour 212.

Figure 5C:
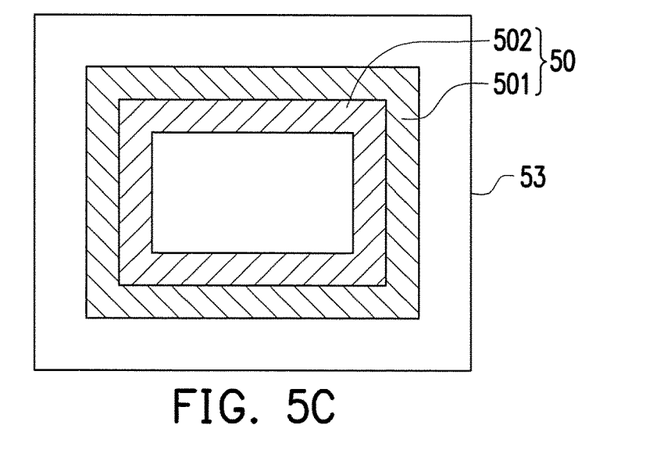
FIG. 5C is a schematic diagram of combined coloring information according to an embodiment of the present invention.

FIG. 5C is a schematic diagram of combined coloring information according to an embodiment of the present invention. Referring to FIG. 2, FIG. 5A to FIG. 5C, in an embodiment, the image file 51 and the image file 52 is combined into an image file 53 in the combined coloring information. For example, the valid region 501 in the image file 51 and the valid region 502 in the image file 52 may be combined as a valid region 50 in the image file 53. The valid region 50 corresponds to a moving region of the ink jet head 112*b* during a simultaneous coloring operation on the object contour 21. For example, the valid region 50 may be used to indicate coordinate information of the object contour 21 (or the coloring region 41 in FIG. 4C). According to the image file 53, the controller 113 may control the ink jet head 112*b* to perform the simultaneous coloring operation on the object contour 21. As compared with embodiments of FIG. 5A and FIG. 5B, in an embodiment of FIG. 5C, a reading time (or a file transmission time) of the image file 53 is less than a total reading time of the image files 51 and 52. In addition, if the ink jet head 112*b* returns to an initial position after completing a single layer coloring operation on a single printing layer each time, in the embodiment of FIG. 5C, the ink jet head 112*b* returns to the initial position (only) after completing the simultaneous coloring operation on multiple printing layers. Therefore, time cost by performing the multilayer simultaneous coloring operation according to the embodiment of FIG. 5C is less than time cost by continuously performing the single layer coloring operation according to the embodiments of FIG. 5A and FIG. 5B.

In an embodiment, the operation of combining the first contour coloring information and the second contour coloring information into the combined coloring information further includes performing at least one of an edge smoothing operation and a gap filling operation on the third valid region, so as to improve coloring completion of the simultaneous coloring operation by using the combined coloring information. Taking FIG. 5C as an example, performing the edge smoothing operation on the valid region 50 may enable edges of the valid region 501 and the valid region 502 to be relatively smooth. In addition, performing the gap filling operation on the valid region 50 may reduce a gap between the valid region 501 and the valid region 502. It should be noted that in an embodiment, the valid regions 501 and 502 may be compared to obtain information of whether the object contour 211 is covered by the object contour 212 in the coloring direction 201.

Back to the embodiment of FIG. 3, if the similarity degree of the second contour coloring information and the third contour coloring information conforms to the default condition, a simultaneous coloring operation on the object contour 22 may be performed. For example, the controller 113 may control the ink jet head 112*b* to move above the object contour 22 and feed out a dye of a specific color, so as to simultaneous color the object contours 212 and 213. It should be noted that the operation for determining whether the similarity degree of the second contour coloring information and the third contour coloring information conforms to the default condition may be referenced to the operation for determining whether the similarity degree of the first contour coloring information and the second contour coloring information conforms to the default condition above, so the descriptions thereof are omitted herein. In addition, for other printing layers of the 3D object 200 in FIG. 2 and FIG. 3, whether to use the multilayer simultaneous coloring operation or the single layer coloring operation is determined according to the foregoing rule so as to color object contours of different printing layers.

Figure 6:
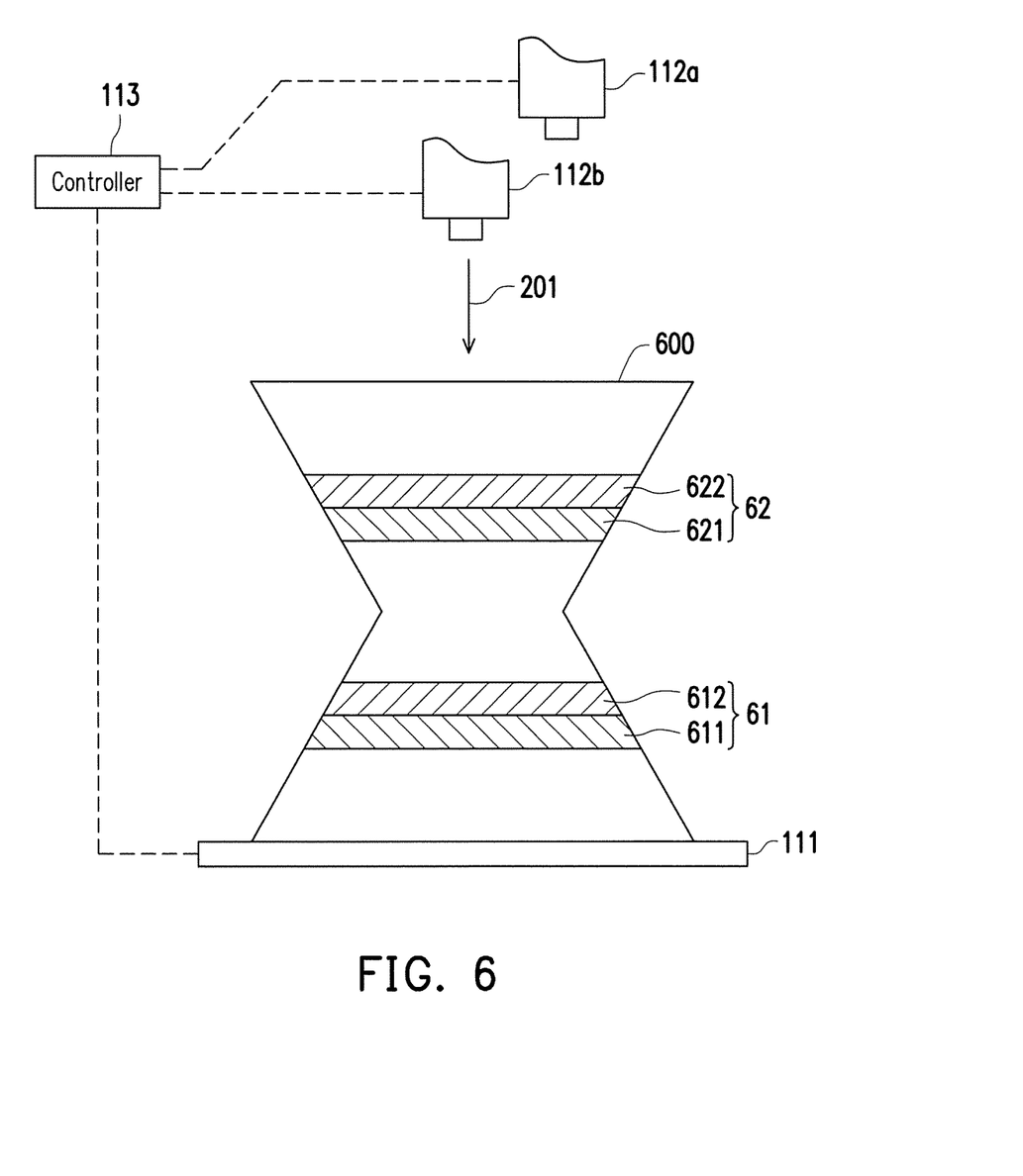
FIG. 6 is a schematic diagram of a 3D printing operation according to another embodiment of the present invention.

FIG. 6 is a schematic diagram of a 3D printing operation according to another embodiment of the present invention. Referring to FIG. 6, during a 3D printing operation of a 3D object 600, the controller 113 may dynamically select to use the multilayer simultaneous coloring operation or the single layer coloring operation to color object contours of each layer in the 3D object 600. For example, because the similarity degree of contour coloring information corresponding to the object contour 61 (including object contours 611 and 612 of two adjacent printing layers) conforms the default condition, the controller 113 may control the ink jet head 112*b* to perform the simultaneous coloring operation on the object contour 61. In addition, because the similarity degree of contour coloring information corresponding to the object contour 62 (including object contours 621 and 622 of two adjacent printing layers) does not conform the default condition (for example, the object contour 621 is covered by the object contour 622 in the coloring direction 201), the controller 113 may control the ink jet head 112*b* to perform the single layer coloring operation on the object contour 621. After completing the single layer coloring operation on the object contour 621, the controller 113 may dynamically determine to use the simultaneous coloring operation or the single layer coloring operation to color the object contour 622.

Figure 7:
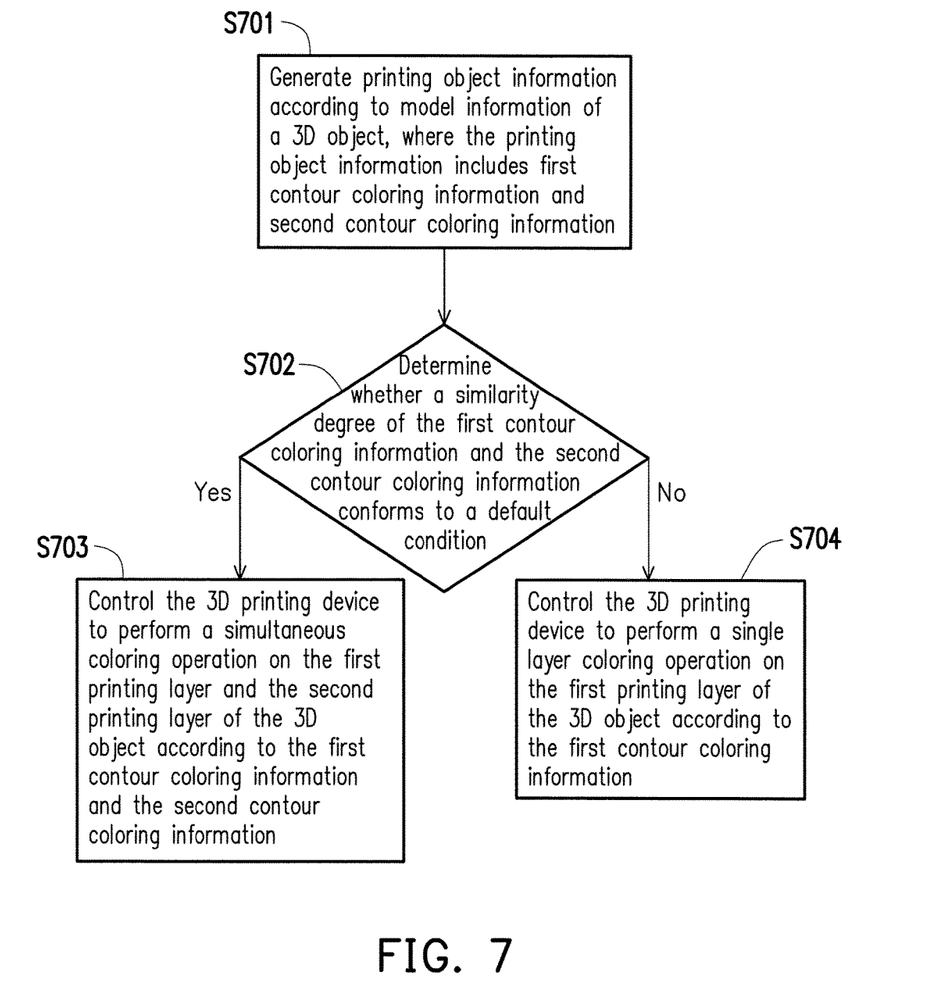
FIG. 7 is a flowchart of a 3D printing coloring method according to an embodiment of the present invention.

FIG. 7 is a flowchart of a 3D printing coloring method according to an embodiment of the present invention. Referring to FIG. 7, step S701 includes generating printing object information according to model information of a 3D object, where the printing object information includes first contour coloring information corresponding to a first printing layer of the 3D object and second contour coloring information corresponding to a second printing layer of the 3D object, and the first printing layer is adjacent to the second printing layer. Step S702 includes determining whether a similarity degree of the first contour coloring information and the second contour coloring information conforms to a default condition. If the similarity degree conforms to the default condition, step S703 includes controlling, according to the first contour coloring information and the second contour coloring information, the 3D printing device to perform a simultaneous coloring operation on the first printing layer and the second printing layer of the 3D object. Otherwise, if the similarity degree does not conform to the default condition, step S704 includes controlling, according to the first contour coloring information, the 3D printing device to perform a single layer coloring operation on the first printing layer of the 3D object.

Figure 8:
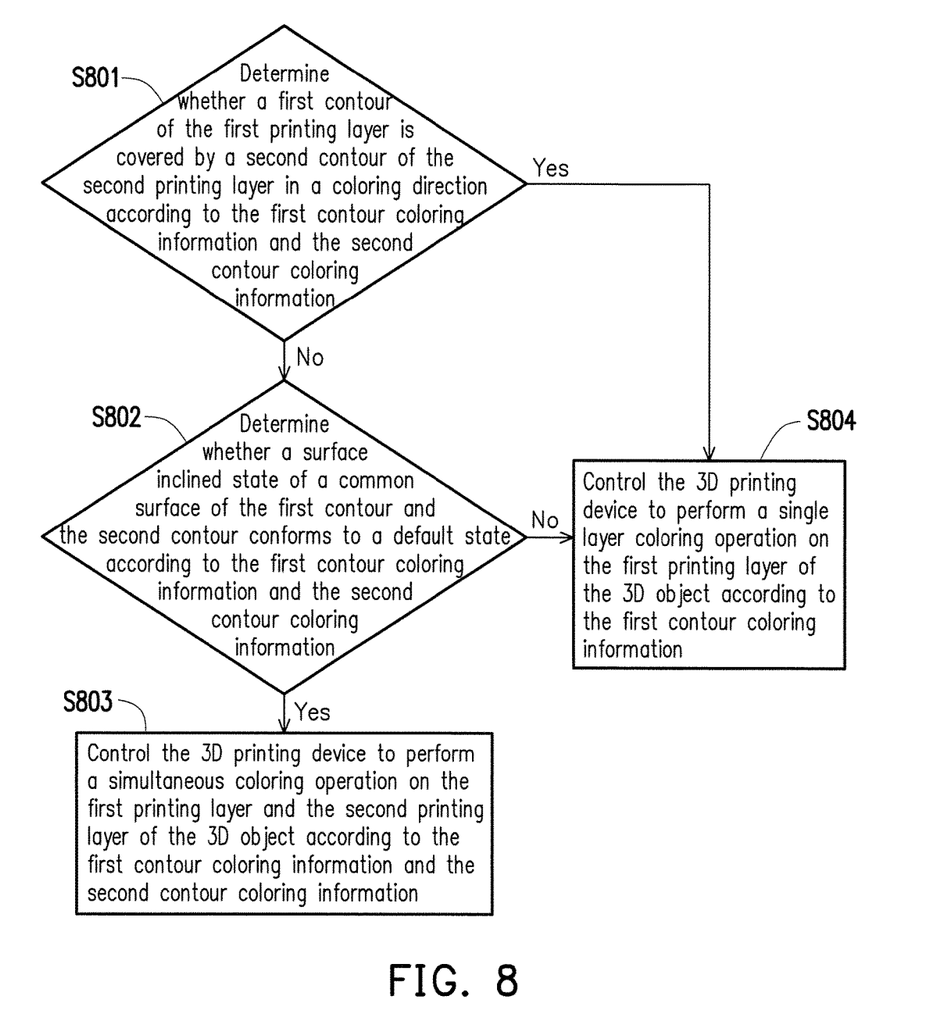
FIG. 8 is a flowchart of a 3D printing coloring method according to another embodiment of the present invention.

FIG. 8 is a flowchart of a 3D printing coloring method according to another embodiment of the present invention. Referring to FIG. 8, step S801 includes determining, according to the first contour coloring information and the second contour coloring information, whether a first contour of the first printing layer is covered by a second contour of the second printing layer in a coloring direction. If the first contour of the first printing layer is covered by the second contour of the second printing layer in the coloring direction, step S804 includes controlling, according to the first contour coloring information, the 3D printing device to perform a single layer coloring operation on the first printing layer of the 3D object. If the first contour of the first printing layer is not covered by the second contour of the second printing layer in the coloring direction, step S802 includes determining, according to the first contour coloring information and the second contour coloring information, whether a surface inclined state of a common surface of the first contour and the second contour conforms to a default state. If the surface inclined state of the common surface of the first contour and the second contour conforms to the default state, step S803 includes controlling, according to the first contour coloring information and the second contour coloring information, the 3D printing device to perform a simultaneous coloring operation on the first printing layer and the second printing layer of the 3D object. Otherwise, if the surface inclined state of the common surface of the first contour and the second contour does not conform to the default state, enters step S804.

However, steps in FIG. 7 and FIG. 8 are described in detail as above, and the descriptions thereof are omitted herein. It should be noted that the steps in FIG. 7 and FIG. 8 may be implemented as multiple program code or circuits, and this is not limited in the present invention. For example, in an example of FIG. 1, the storage device 121 stores multiple modules, and the processor 122 may execute these modules to perform steps in the 3D printing coloring method. Alternatively, in another embodiment of FIG. 1, the processor 122 may include multiple circuits, and these circuits are configured to execute steps in the 3D printing coloring method. In addition, the method of FIG. 7 and FIG. 8 may be used by combining the foregoing exemplary embodiment or may be used separately, and this is not limited in the present invention.

Based on the above, the 3D printing coloring method and the 3D printing system may determine, according to contour coloring information of the 3D object, whether the 3D printing device maintains to perform a single layer coloring operation on an object contour of a single printing layer or switches to perform a multilayer simultaneous coloring operation on object contours of multiple printing layers, so as to improve a working efficiency of the 3D printing device. In addition, the present invention also provides multiple determining mechanisms to determine use time of the multilayer simultaneous coloring operation, and this conforms to practical requirements.

Although the present invention has been disclosed by using embodiments, the embodiments are not intended to limit the present invention, and any person of ordinary skill in the art may make various modifications and improvements without departing from the spirit and scope of the present invention; therefore, the protection scope of the present invention should be subject to the scope defined by the attaching claims.

What is claimed is:

1. A three dimension (3D) printing coloring method, applied to a 3D printing system comprising a storage device and a 3D printing device, wherein the storage device is configured to store model information of a 3D object, and the 3D printing coloring method comprises:
   generating printing object information according to the model information of the 3D object, wherein the printing object information comprises first contour coloring information corresponding to a first printing layer of the 3D object and second contour coloring information corresponding to a second printing layer of the 3D object, and the first printing layer is adjacent to the second printing layer;
   determining whether an included angle degree between a horizontal direction and a vertical direction of a common surface formed by a surface of a first contour of the first printing layer and a surface of a second contour of the second printing layer is larger than a default angle value;
   if the included angle degree between the horizontal direction and the vertical direction of the common surface is larger than the default angle value, controlling the 3D printing device to synchronously color the surface of the first contour and the surface of the second contour according to the first contour coloring information and the second contour coloring information; and
   if the included angle degree between the horizontal direction and the vertical direction of the common surface is not larger than the default angle value, controlling the 3D printing device to only color the surface of the first contour according to the first contour coloring information, and then controlling the 3D printing device to color the surface of the second contour according to the second contour coloring information after the surface of the first contour is colored.

2. The 3D printing coloring method according to claim 1, further comprising:
   determining whether the first contour of the first printing layer is covered by the second contour of the second printing layer in a coloring direction,
   wherein the coloring direction is a direction that an ink jet head of the 3D printing device feeds out dye.

3. The 3D printing coloring method according to claim 1, wherein the vertical direction of the common surface is a normal vector direction of the common surface.

4. The 3D printing coloring method according to claim 1, wherein the horizontal direction is a direction parallel to a horizontal plane.

5. The 3D printing coloring method according to claim 1, wherein the horizontal direction is a direction parallel to a bearing surface on a platform of the 3D printing device for bearing the 3D object.

6. The 3D printing coloring method according to claim 1, wherein the step of controlling the 3D printing device to synchronously color the surface of the first contour and the surface of the second contour according to the first contour coloring information and the second contour coloring information comprises:
   combining the first contour coloring information and the second contour coloring information into combined coloring information; and
   controlling the 3D printing device to synchronously color the surface of the first contour and the surface of the second contour according to the combined coloring information.

7. The 3D printing coloring method according to claim 6, wherein the step of combining the first contour coloring information and the second contour coloring information into the combined coloring information comprises:
   combining a first valid region of the first contour coloring information and a second valid region of the second contour coloring information into a third valid region of the combined coloring information,
   wherein the first valid region is configured to be colored according to the first contour coloring information, and the second valid region is configured to be colored according to the second contour coloring information, wherein the third valid region corresponds to a moving region of a ink jet head of the 3D printing device when the surface of the first contour and the surface of the second contour are colored synchronously.

8. The 3D printing coloring method according to claim 7, wherein the step of combining the first contour coloring information and the second contour coloring information into the combined coloring information further comprises:

performing at least one of an edge smoothing operation and a gap filling operation on the third valid region of the combined coloring information.

9. A 3D printing system, comprising:
a 3D printing device;
a storage device, configured to store model information of a 3D object; and
a processor, coupled to the 3D printing device and the storage device, and configured to:
generate printing object information according to the model information of the 3D object, wherein the printing object information comprises first contour coloring information corresponding to a first printing layer of the 3D object and second contour coloring information corresponding to a second printing layer of the 3D object, and the first printing layer is adjacent to the second printing layer;
determine whether an included angle degree between a horizontal direction and a vertical direction of a common surface formed by a surface of a first contour of the first printing layer and a surface of a second contour of the second printing layer is larger than a default angle value;
control the 3D printing device to synchronously color the surface of the first contour and the surface of the second contour according to the first contour coloring information and the second contour coloring information if the included angle degree between the horizontal direction and the vertical direction of the common surface is larger than the default angle value; and
control the 3D printing device to only color the surface of the first contour according to the first contour coloring information if the included angle degree between the horizontal direction and the vertical direction of the common surface is not larger than the default angle value, and then control the 3D printing device to color the surface of the second contour according to the second contour coloring information after the surface of the first contour is colored.

10. The 3D printing system according to claim 9, wherein the processor is further configured to:

determine whether the first contour of the first printing layer is covered by the second contour of the second printing layer in a coloring direction, wherein the coloring direction is a direction that an ink jet head of the 3D printing device feeds out dye.

11. The 3D printing system according to claim 9, wherein the vertical direction of the common surface is a normal vector direction of the common surface.

12. The 3D printing system according to claim 9, wherein the horizontal direction is a direction parallel to a horizontal plane.

13. The 3D printing system according to claim 9, wherein the horizontal direction is a direction parallel to a bearing surface on a platform of the 3D printing device for bearing the 3D object.

14. The 3D printing system according to claim 9, wherein the operation of controlling the 3D printing device to synchronously color the surface of the first contour and the surface of the second contour according to the first contour coloring information and the second contour coloring information comprises:

combining the first contour coloring information and the second contour coloring information into combined coloring information; and controlling the 3D printing device to synchronously color the surface of the first contour and the surface of the second contour according to the combined coloring information.

15. The 3D printing system according to claim 14, wherein the operation of combining the first contour coloring information and the second contour coloring information into the combined coloring information comprises:

combining a first valid region of the first contour coloring information and a second valid region of the second contour coloring information into a third valid region of the combined coloring information, wherein the first valid region is configured to be colored according to the first contour coloring information, and the second valid region is configured to be colored according to the second contour coloring information, wherein the third valid region corresponds to a moving region of a ink jet head of the 3D printing device when the surface of the first contour and the surface of the second contour are colored synchronously.

16. The 3D printing system according to claim 15, wherein the operation of combining the first contour coloring information and the second contour coloring information into the combined coloring information further comprises:

performing at least one of an edge smoothing operation and a gap filling operation on the third valid region of the combined coloring information.

* * * * *